(12) United States Patent
Neefs

(10) Patent No.: US 6,862,665 B2
(45) Date of Patent: Mar. 1, 2005

(54) METHOD, SYSTEM, AND APPARATUS FOR SPACE EFFICIENT CACHE COHERENCY

(75) Inventor: Henk G. Neefs, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 10/199,579

(22) Filed: Jul. 19, 2002

(65) Prior Publication Data

US 2004/0015661 A1 Jan. 22, 2004

(51) Int. Cl.[7] .............................................. G06F 12/00
(52) U.S. Cl. ................................... 711/146; 711/141
(58) Field of Search ................................ 711/141, 144, 711/146

(56) References Cited

U.S. PATENT DOCUMENTS

| | | | | |
|---|---|---|---|---|
| 5,155,824 A | * | 10/1992 | Edenfield et al. | ........... 711/143 |
| 5,249,284 A | * | 9/1993 | Kass et al. | ................... 711/141 |
| 5,634,068 A | * | 5/1997 | Nishtala et al. | ............. 711/141 |
| 6,049,845 A | * | 4/2000 | Bauman et al. | ............. 710/113 |
| 6,385,697 B1 | * | 5/2002 | Miyazaki | ..................... 711/128 |
| 2003/0200404 A1 | * | 10/2003 | Wicki et al. | ................. 711/156 |

* cited by examiner

Primary Examiner—Matthew Kim
Assistant Examiner—Hetul Patel
(74) Attorney, Agent, or Firm—Michael J. Nesheiwat

(57) ABSTRACT

A schematic, system, and flowchart to facilitate storage of directory information for a cache coherency protocol. The protocol allows for at least a single bit of directory information overwriting data stored in a cache coherency unit based at least in part on at least one status bit stored in a storage unit. Likewise, the cache coherency protocol determines whether the cache shared.

22 Claims, 6 Drawing Sheets ature is not limited to ECCand status bit(s).

METHOD, SYSTEM, AND APPARATUS FOR SPACE EFFICIENT CACHE COHERENCY

BACKGROUND

The present disclosure is related to memory, such as, coherency protocols for memory.

As is well known, a cache stores information, such as, data and coherency state, for a computer or computing system in order to decrease data retrieval times for a processor.

For systems incorporating multi-threaded processor and/or multiple processing devices, the multiple threads and/or multiple processors may often times need to share data stored within the system. The system needs to insure that a thread or processor accesses the most recent and up-to-date data or coherency state information and also to insure that a thread or processor does not access and modify data associated with another thread or processor. Thus, in multi-threaded processors and/or multi-processor systems, cache coherency protocols are utilized for synchronization of information written from, or read into, the cache memory. Furthermore, the cache coherency protocol insures that the information from the cache that is accessed by a thread or processor is the most recent copy of the information.

A typical cache coherency protocol is a directory based cache coherency protocol that utilizes multiple bits to designate a directory and register the respective owner(s) or sharers of the information. However, storage of several bits for each directory is inefficient and costly and precludes the use of directory based coherency protocols for large systems incorporating multiple processors.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to a directory based cache coherency protocol for supporting systems with multiple processors. As previously described, directory based cache coherency protocols utilize multiple bits to designate a directory and register the respective owner(s) and/or sharers of the information. However, storage of several bits for each directory is inefficient and costly and precludes the use of directory based coherency protocols for large systems incorporating multiple processors. In contrast, a storage scheme to store directory information for a cache coherency unit that utilizes a single bit increases space efficiency for a directory based cache coherency protocol or snooping protocols.

In one aspect, the claimed subject matter facilitates a storage scheme that allows at least a single bit of directory information overwriting data stored in a cache coherency unit based at least in part on at least one status bit stored in a storage unit. In another aspect, the claimed subject matter facilitates a storage scheme to indicate whether the cache coherency unit is exclusive or shared. As is well known in the art, exclusive refers to a single copy of a cache coherency unit for a single owner. In contrast, shared refers to multiple copies of the cache coherency unit for multiple owners. In yet another aspect, the claimed subject matter facilitates the use of a storage scheme for use in the following applications: an on chip cache in a single processor system, a cache in a multiple processor system, a chipset cache, a memory controller cache, and for main memory, such as, dynamic random access memory (DRAM).

As is well known in the art, a system with a directory based cache protocol utilizes a static home where the directory is kept. Likewise, the static home stores any non-exclusive data. However, other types of data may reside anywhere in the system. If a functional element requests data, a request is sent to the static home such that the directory indicates the location of where the data is to be read.

Figure 1:
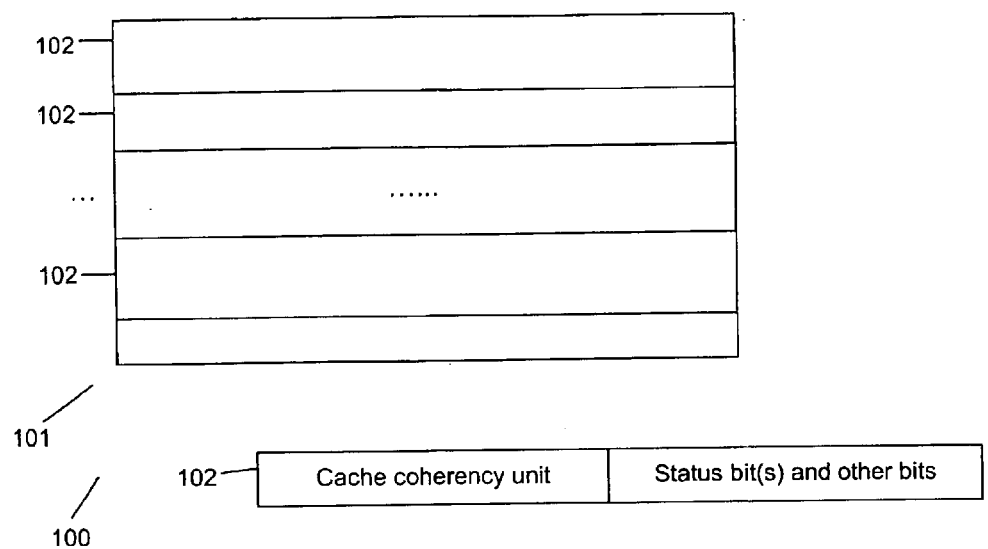
FIG. 1 is a schematic diagram of a cache coherency unit utilized by an embodiment.

FIG. 1 is a schematic diagram of a cache coherency unit utilized by an embodiment. The schematic 100 comprises a memory 101 with a plurality of storage units 102. Each storage unit comprises a cache coherency unit and support bits, such as, at least one status bit to indicate the type of information stored in the cache coherency unit and Error Correction Code bits (ECC). In one embodiment, the cache coherency unit is a cache line. In one embodiment, the memory is an on chip cache in a single processor system. In another embodiment, the memory is a cache in a multiple processor system. In yet another embodiment, the memory is a chipset cache. In still yet another embodiment, the memory is a main memory, such as, a DRAM. In another embodiment, the memory is a memory controller cache.

However, the claimed subject matter is not limited to ECC bits and status bit(s). For example, the support bits may include only status bit(s) and exclude ECC bits, or additional bits, such as, state bits indicating the state of the cache coherency unit.

The storage unit 102 stores at least one status bit to indicate whether the information stored within the cache coherency unit is either directory or data information. In one embodiment, a value of logic zero for a status bit indicates that the cache coherency unit stores data information. In contrast, a value of logic one indicates that the cache coherency unit stores directory information. However, the claimed subject matter is not limited in this manner. For example, a value of logic one for a status bit indicates that the cache coherency unit stores data information.

In one embodiment, the cache coherency unit stores at least a single bit of data information. However, the directory information overwrites at least one bit of data information when the data information is cached somewhere else in the system. In another embodiment, the directory information is stored within a single cache coherency unit.

In one embodiment, the cache coherency unit is the unit that is kept coherent in the system but when directory information is stored over the data, that directory information does not necessarily travel with the data around the system.

The schematic diagram supports a conventional system or processor bus, as well as point-to-point links. Likewise, the schematic diagram supports directory based cache coherency protocols, snooping scheme protocols, or hybrids of both.

Figure 2:
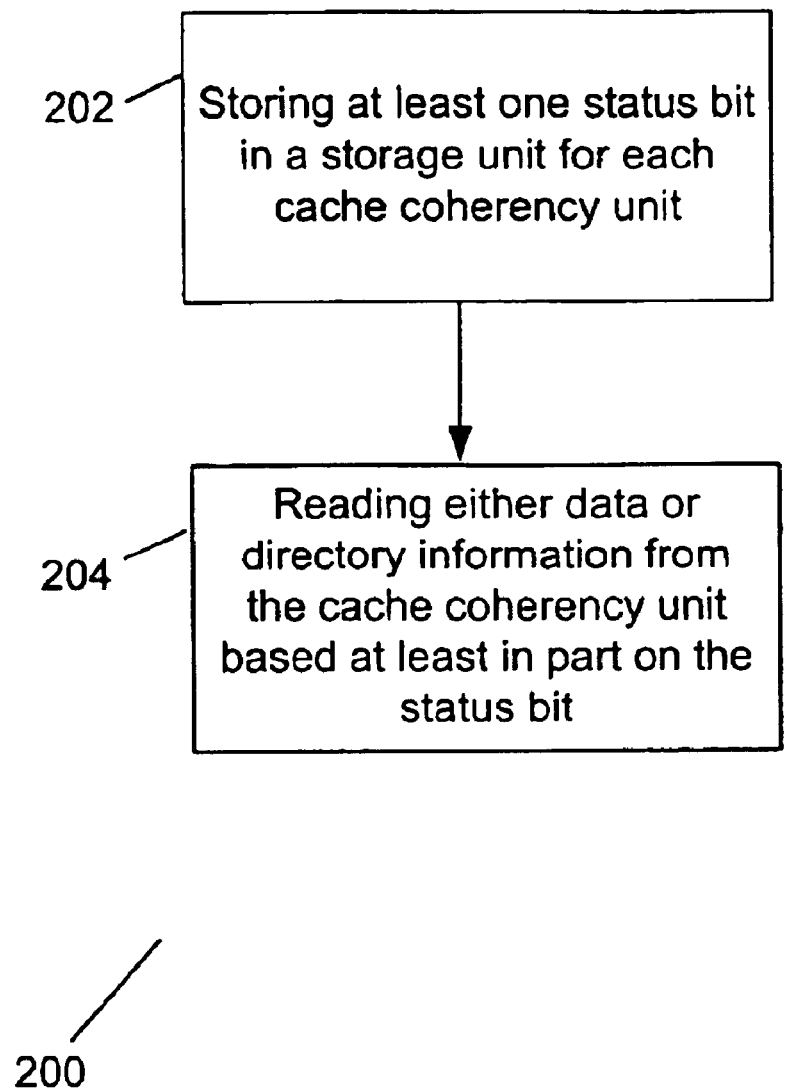
FIG. 2 is a flowchart of a method utilized by an embodiment.

FIG. 2 is a flowchart of a method utilized by an embodiment. The flowchart includes, but is not limited to, a plurality of blocks 202 and 204. In one embodiment, the flowchart depicts a method for efficiently storing status bits for a coherency protocol.

Storing at least one status bit in a storage unit, as illustrated by block 202. In one embodiment, the storage unit comprises a cache coherency unit, such as, a cache line. Reading either data or directory information from the cache coherency unit based at least in part on the status bit, as illustrated by block 204. For example, in one embodiment the cache coherency unit is storing data information if the status bit has a value of logic zero. In contrast, the cache coherency unit is storing directory information over some part of the data information if the status bit has a value of logic one.

However, the claimed subject matter is not limited to a value of logic zero to indicate the cache coherency unit is storing data information. For example, in another embodiment the cache coherency unit is storing data information if the status bit has a value of logic one.

Figure 3:
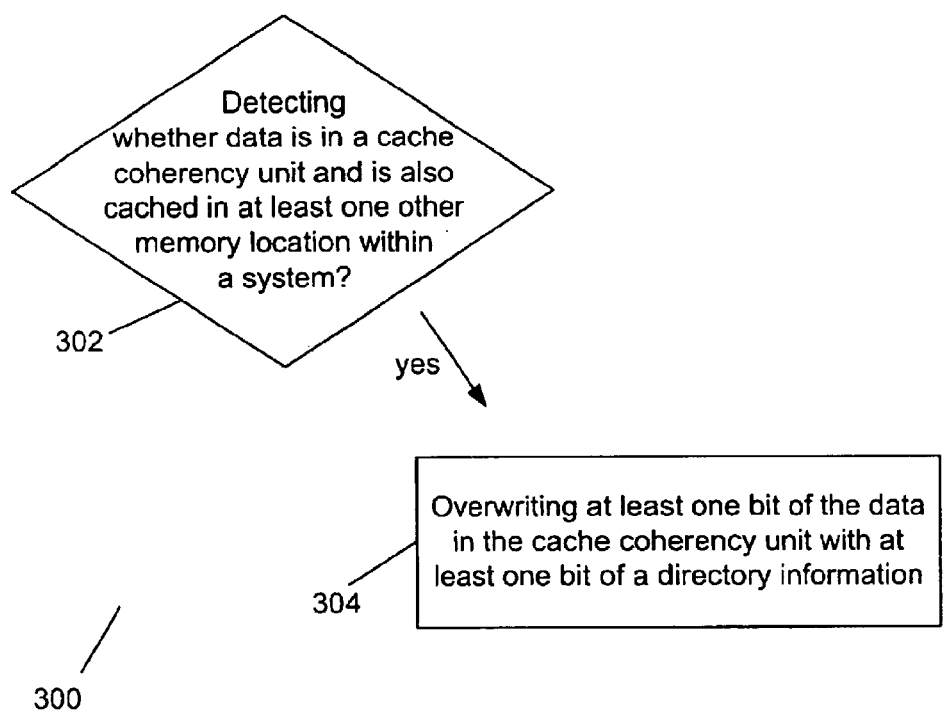
FIG. 3 is a flowchart of a method utilized by an embodiment

FIG. 3 is a flowchart of a method utilized by an embodiment. The flowchart includes, but is not limited to, a plurality of diamonds and blocks 302 and 304. In one embodiment, the flowchart depicts a method for efficiently storing directory information for supporting a cache coherency protocol.

Detecting whether data that is stored within a cache coherency unit is also cached in at least one other memory location within a system, as illustrated by diamond 302. If so, overwriting at least one bit of the data in the cache coherency unit with at least one bit of directory information, as illustrated by block 304.

However, the claimed subject matter is not limited to overwriting only one bit of the data information with one bit of directory information. For example, the complete set of directory information bits may be written into the cache coherency unit. In one embodiment, the cache coherency unit is a cache line.

Figure 4:
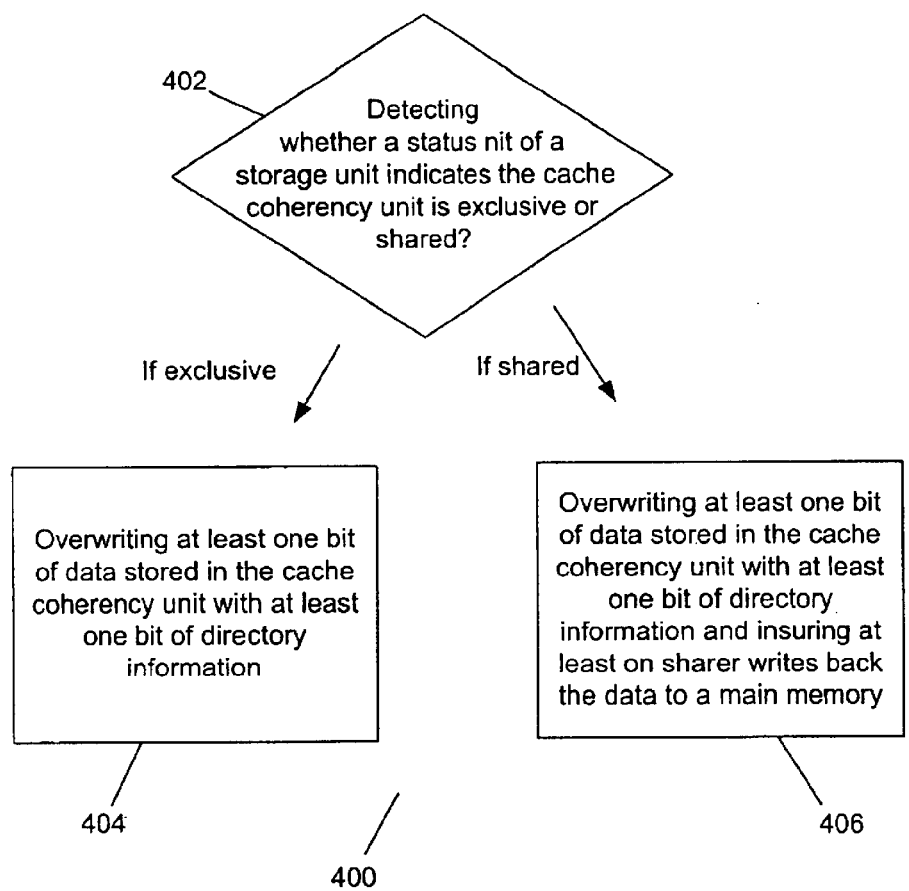
FIG. 4 is a flowchart of a method utilized by an embodiment.

FIG. 4 is a flowchart of a method utilized by an embodiment. The flowchart includes, but is not limited to, a plurality of blocks and diamonds 402, 404, and 406. In one embodiment, the flowchart depicts a method for storing directory information for supporting a coherency protocol based at least in part on whether the cache coherency unit is exclusive or shared.

Detecting whether a status bit of a storage unit indicates the cache coherency unit is exclusive or shared, as illustrated by diamond 402. If the cache coherency unit is exclusive, overwriting at least one bit of the data stored in the cache coherency unit with at least one bit of directory information, as illustrated by block 404. However, overwriting at least one bit of the data stored in the cache coherency unit with at least one bit of directory information and insuring at least one sharer writes back the data to a main memory, applies otherwise, as illustrated by block 406.

Figure 5:
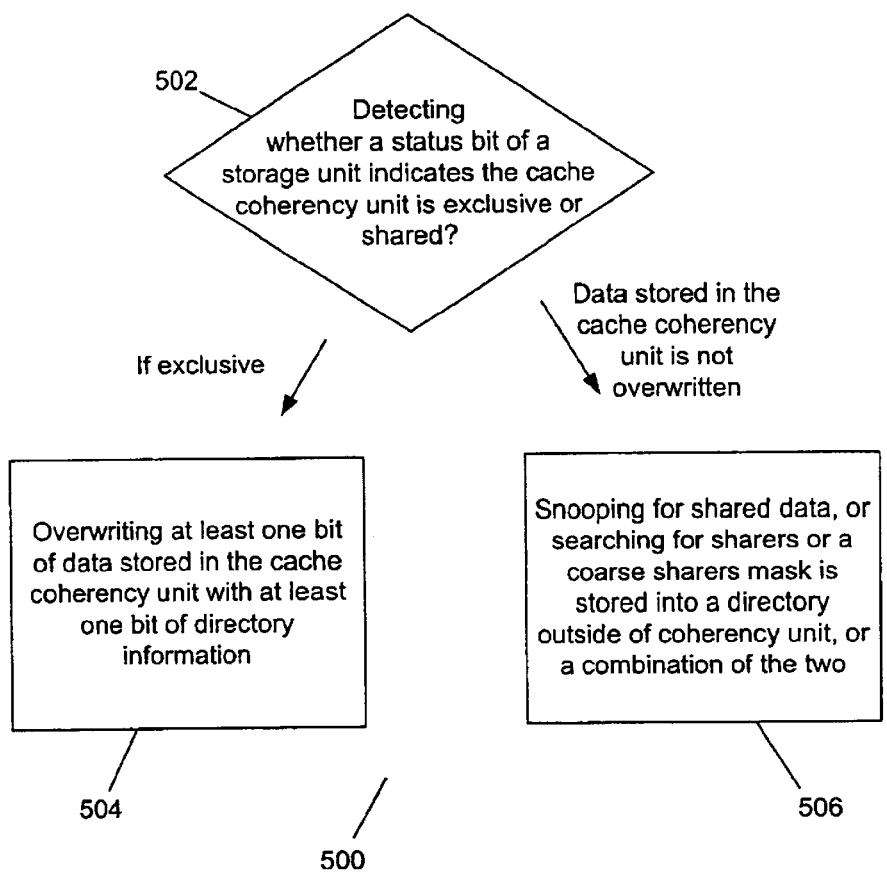
FIG. 5 is a flowchart of a method utilized by an embodiment.

FIG. 5 is a flowchart of a method utilized by an embodiment. The flowchart includes, but is not limited to, a plurality of blocks and diamonds 502, 504, and 506. In one embodiment, the flowchart depicts a method for storing directory information for supporting a coherency protocol based at least in part on whether the cache coherency unit is exclusive or shared.

Detecting whether a status bit of a storage unit indicates the cache coherency unit is exclusive or shared, as illustrated by diamond 502. If the cache coherency unit is exclusive, overwriting at least one bit of the data stored in the cache coherency unit with at least one bit of directory information, as illustrated by block 504. However, snooping for shared data or sharers, or a coarse sharers mask stored into a directory outside of the coherency unit, or combination of the two, applies otherwise, as illustrated by block 506.

Figure 6:
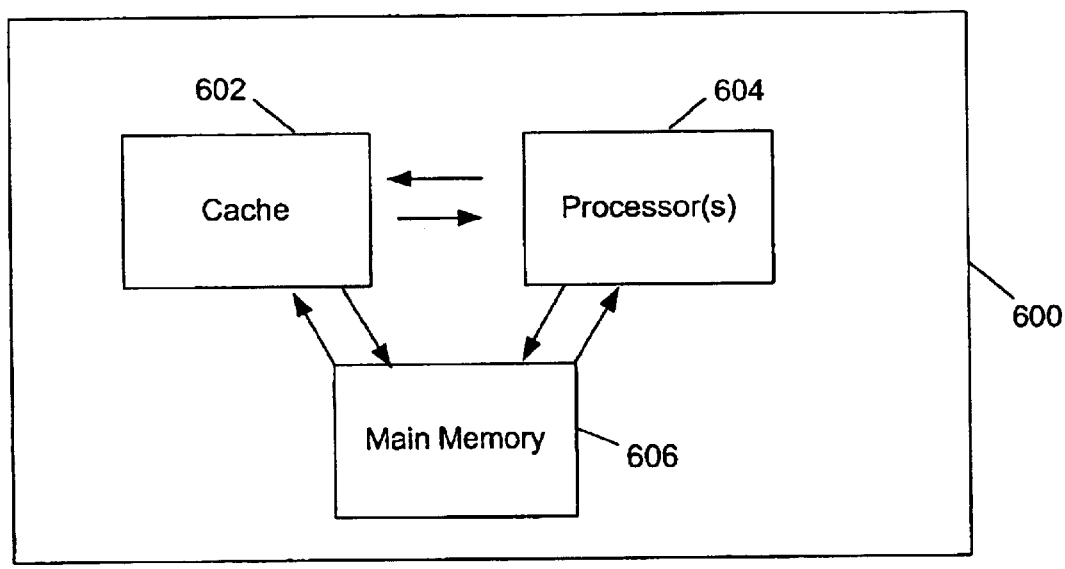
FIG. 6 is a system utilized by an embodiment.

FIG. 6 is a system utilized by an embodiment. The system 600 comprises a cache 602, a processor 604, and a main memory 606. In one embodiment, the system 600 is a single processor system. In an alternative embodiment, the system comprises multiple processors 604 and multiple caches 602. The processor decodes and executes instructions and requests data and directory information from the cache and main memory 602 and 606.

The system facilitates a storage scheme that allows at least a single bit of directory information overwriting data stored in a cache coherency unit. For example, the system stores at least one status bit in a storage unit as depicted in connection with FIG. 1. In one embodiment, the cache 602 is a chipset cache and stores the status bit for each cache coherency unit. In another embodiment, the cache 602 is a memory controller cache and stores the status bit for each cache coherency unit. In yet another embodiment, the cache 602 is an on chip cache and stores the status bit for each cache coherency unit.

The system supports the schematic and methods depicted in connection with FIGS. 1–5. In one embodiment, the main memory 606 is a plurality of DRAMs, such as, synchronous DRAMs.

While certain features of the claimed subject matter have been illustrated and detailed herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. An apparatus comprising:
    a memory with a plurality of storage units, each one of the plurality of storage units include a cache coherency unit; and
    the plurality of storage units to store at least one status bit to indicate whether the cache coherency unit contains data or directory information, wherein the directory information is at least two bits and is not completely stored in the cache coherency unit, but completely stored in the storage unit.

2. The apparatus of claim 1 wherein the memory is either one of an on chip cache, chipset cache, a memory controller cache, or a main memory.

3. The apparatus of claim 1 wherein the apparatus is to overwrite the data information with directory information when the data information is cached somewhere else in a system.

4. The apparatus of claim 1 wherein the directory information is at least one bit and is completely stored in the cache coherency unit.

5. The apparatus of claim 1 wherein the directory information is to facilitate a directory based cache coherency protocol.

6. The apparatus of claim 1 wherein the memory is coupled to a processor by either one of a conventional bus or a point-to-point link.

7. The apparatus of claim 1 wherein the cache coherency unit is a cache line.

8. A method for storing status bits for a coherency protocol comprising:

storing at least one status bit for each cache coherency unit; and reading either data or directory information from the cache coherency unit based at least in part on the status bit, wherein the directory information is at least two bits and is not completely stored in the cache coherency unit, but completely stored in the storage unit.

9. The method of claim 8 further comprising overwriting the data information with directory information when the data information is cached somewhere else in a system.

10. The method of claim 8 wherein the directory information is at least one bit and is completely stored in the cache coherency unit.

11. The method of claim 8 wherein the directory information is to facilitate a directory based cache coherency protocol.

12. A method for storing directory information for supporting a cache coherency protocol comprising:

detecting whether data that is stored within a cache coherency unit is also cached in at least one other memory location within a system; and overwriting at least one bit of the data in the cache coherency unit with at least one bit of directory information if the data is also cached in at least one other memory location, the directory information is at least two bits and is not completely stored in the cache coherency unit, but completely stored in the storage unit.

13. The method of claim 12 wherein the directory information is at least one bit and is completely stored in a single coherency unit.

14. A system comprising:

at least one processor;

at least one cache, coupled to the processor, with a plurality of storage units, each one of the plurality of storage units to store at least one status bit for a cache coherency unit; and the status bit to indicate whether data or directory information is stored within the cache coherency unit, wherein the directory information is at least two bits and is not completely stored in the cache coherency unit, but completely stored in the storage unit.

15. The system of claim 14 wherein the cache is either one of: an on chip cache, a memory controller cache, or a chipset cache.

16. The system of claim 14 wherein the system is to overwrite the data information of the cache coherency unit with directory information when the data information is cached somewhere else in the system, wherein the cache coherency unit is the unit that is kept coherent in the system, but when directory information overwrites the data information, the directory information does not necessarily travel with the data information around the system.

17. The system of claim 14 wherein the directory information is at least one bit and is completely stored in the cache coherency unit.

18. The system of claim 14 wherein the directory information is to facilitate a directory based cache coherency protocol.

19. The system of claim 14 further comprises a main memory that is coupled to a processor by either one of a conventional bus or a point-to-point link.

20. The system of claim 14 wherein the cache coherency unit is a cache line.

21. A method for storing directory information for supporting a cache coherency protocol comprising:

detecting whether data that is stored within a cache coherency unit is also cached in at least one other memory location within a system; and overwriting at least one bit of the data in the cache coherency unit with at least one bit of directory information if the data is also cached in at least one other memory location based at least in part on an exclusive state of the cache coherency unit, wherein the directory information is at least two bits and is not completely stored in the cache coherency unit, but completely stored in the storage unit.

22. The method of claim 21 wherein the directory information is at least one bit and is completely stored in the cache coherency unit.

* * * * *